(12) United States Patent
Bachmaier et al.

(10) Patent No.: US 12,521,110 B2
(45) Date of Patent: Jan. 13, 2026

(54) KNOTLESS ALL-INSIDE SUTURE CONSTRUCTS AND METHODS OF TISSUE FIXATION

(71) Applicant: Arthrex, Inc., Naples, FL (US)

(72) Inventors: Samuel Bachmaier, Mauern (DE); Raphael Hahn, Munich (DE); Dominik Steffens, Olching (DE)

(73) Assignee: ARTHREX, INC., Naples, FL (US)

( * ) Notice: Subject to any disclaimer, the term of this patent is extended or adjusted under 35 U.S.C. 154(b) by 136 days.

(21) Appl. No.: 18/555,030

(22) PCT Filed: May 16, 2022

(86) PCT No.: PCT/US2022/029377
§ 371 (c)(1),
(2) Date: Oct. 12, 2023

(87) PCT Pub. No.: WO2022/245694
PCT Pub. Date: Nov. 24, 2022

(65) Prior Publication Data
US 2024/0197314 A1  Jun. 20, 2024

Related U.S. Application Data

(60) Provisional application No. 63/190,860, filed on May 20, 2021.

(51) Int. Cl.
*A61B 17/04* (2006.01)
(52) U.S. Cl.
CPC ...... *A61B 17/0469* (2013.01); *A61B 17/0401* (2013.01); *A61B 2017/0404* (2013.01); *A61B 2017/044* (2013.01)

(58) Field of Classification Search
CPC ............ A61B 17/0469; A61B 17/0401; A61B 2017/0404; A61B 2017/044
See application file for complete search history.

(56) References Cited

U.S. PATENT DOCUMENTS

| | | | |
|---|---|---|---|
| 10,786,237 B2 * | 9/2020 | Guerra | A61B 17/0401 |
| 11,272,920 B2 * | 3/2022 | Gustafson | A61B 17/06166 |
| 2010/0256677 A1 * | 10/2010 | Albertorio | A61F 2/0811 |
| | | | 606/232 |
| 2011/0087280 A1 * | 4/2011 | Albertorio | A61F 2/0811 |
| | | | 606/232 |

(Continued)

FOREIGN PATENT DOCUMENTS

WO        2020092048 A1    5/2020

OTHER PUBLICATIONS

International Search Report and Written Opinion for International Application No. PCT/US2022/029377 dated Oct. 6, 2022.

(Continued)

*Primary Examiner* — Phong Son H Dang
(74) *Attorney, Agent, or Firm* — Potomac Law Group, PLLC

(57) ABSTRACT

Knotless, all inside self-locking constructs and methods of tissue repairs are disclosed herein. A flexible strand can be passed through a friction-based locking mechanism to create a plurality of closed, knotless, continuous, adjustable, flexible loops having adjustable perimeters, the loops being located between a loop interconnection and two terminal ends.

16 Claims, 16 Drawing Sheets

(56) References Cited

U.S. PATENT DOCUMENTS

| | | |
|---|---|---|
| 2012/0165866 A1 | 6/2012 | Kaiser et al. |
| 2014/0276992 A1 | 9/2014 | Stone et al. |
| 2014/0277121 A1 | 9/2014 | Pilgeram et al. |
| 2016/0000421 A1 | 1/2016 | Larsen |
| 2018/0221133 A1 | 8/2018 | Lund |
| 2019/0201185 A1 | 7/2019 | Albertorio et al. |
| 2020/0015804 A1 | 1/2020 | Bachmaier et al. |
| 2021/0093316 A1 | 4/2021 | Gustafson |
| 2021/0401567 A1* | 12/2021 | Bachmaier .......... A61F 2/30749 |

OTHER PUBLICATIONS

Invitation to Pay Additional Fees for International Application No. PCT/US2022/029377 dated Jul. 14, 2022.

Extended European Search Report for European Application No. 22805233.8 dated May 12, 2025.

\* cited by examiner

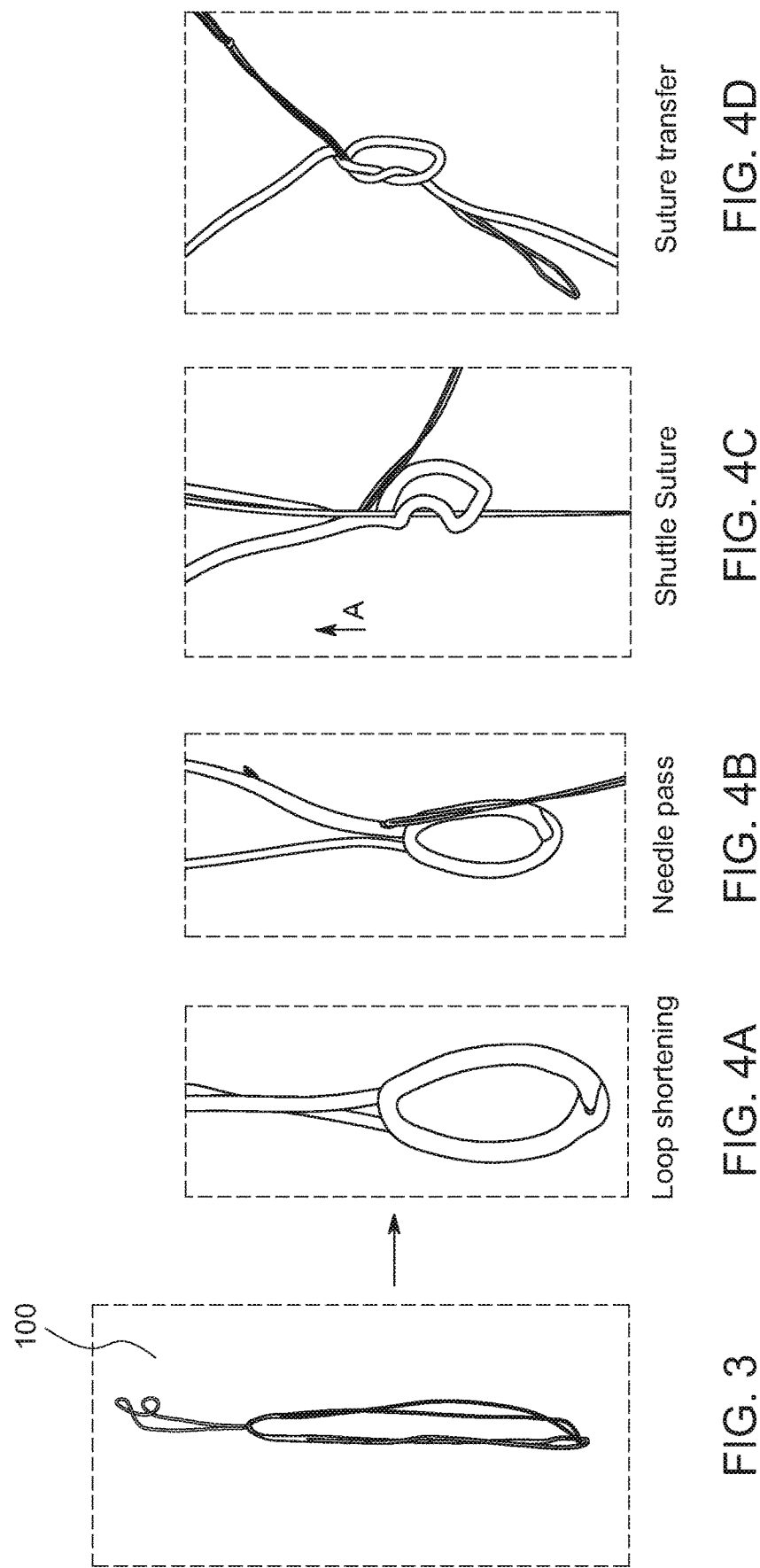

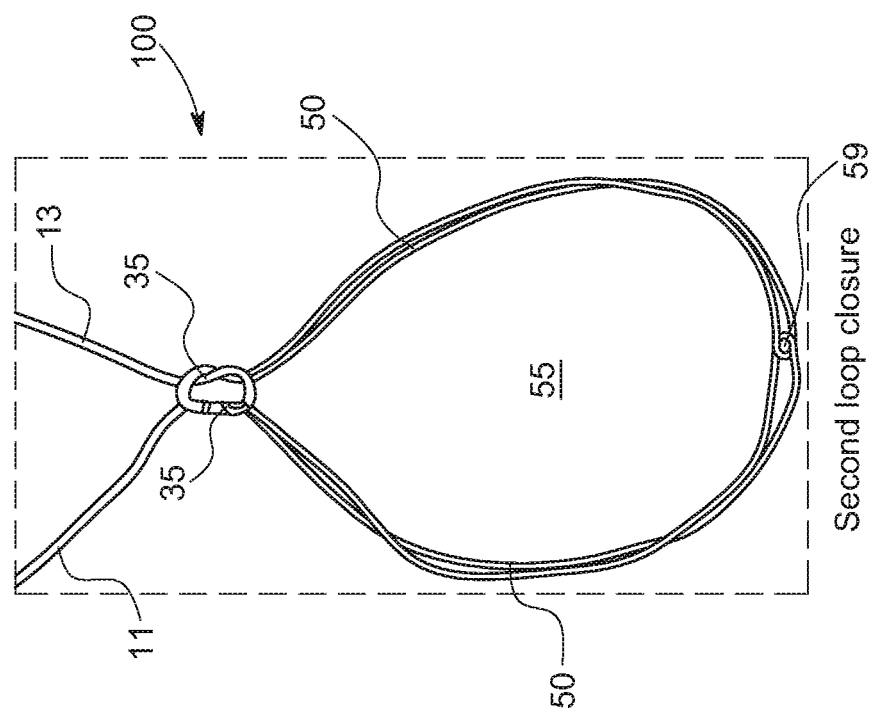
FIG. 4F  Second loop closure
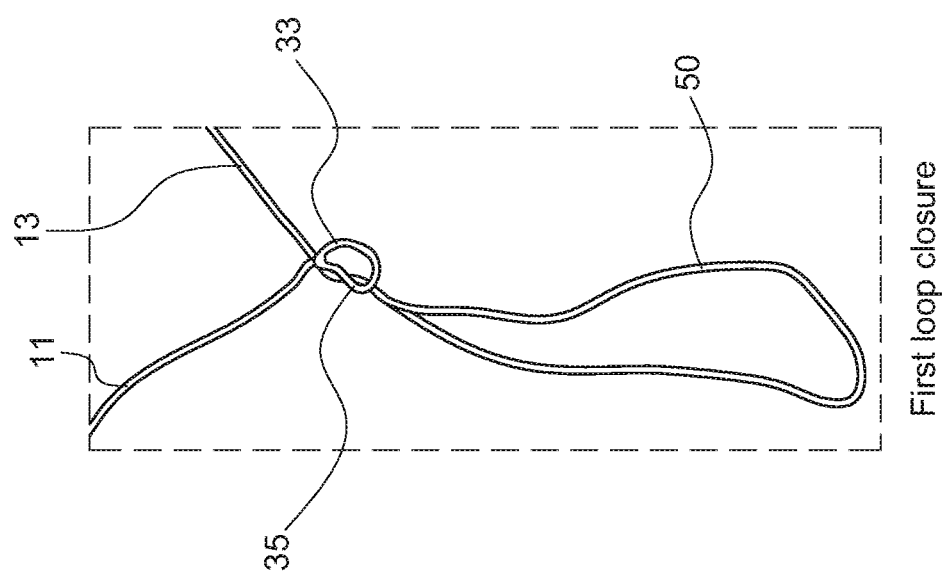
FIG. 4E  First loop closure

Anchor placement and primary deployment

Action transfer with shuttle suture (blue)

Final tensioning

Anchor placement and primary deployment

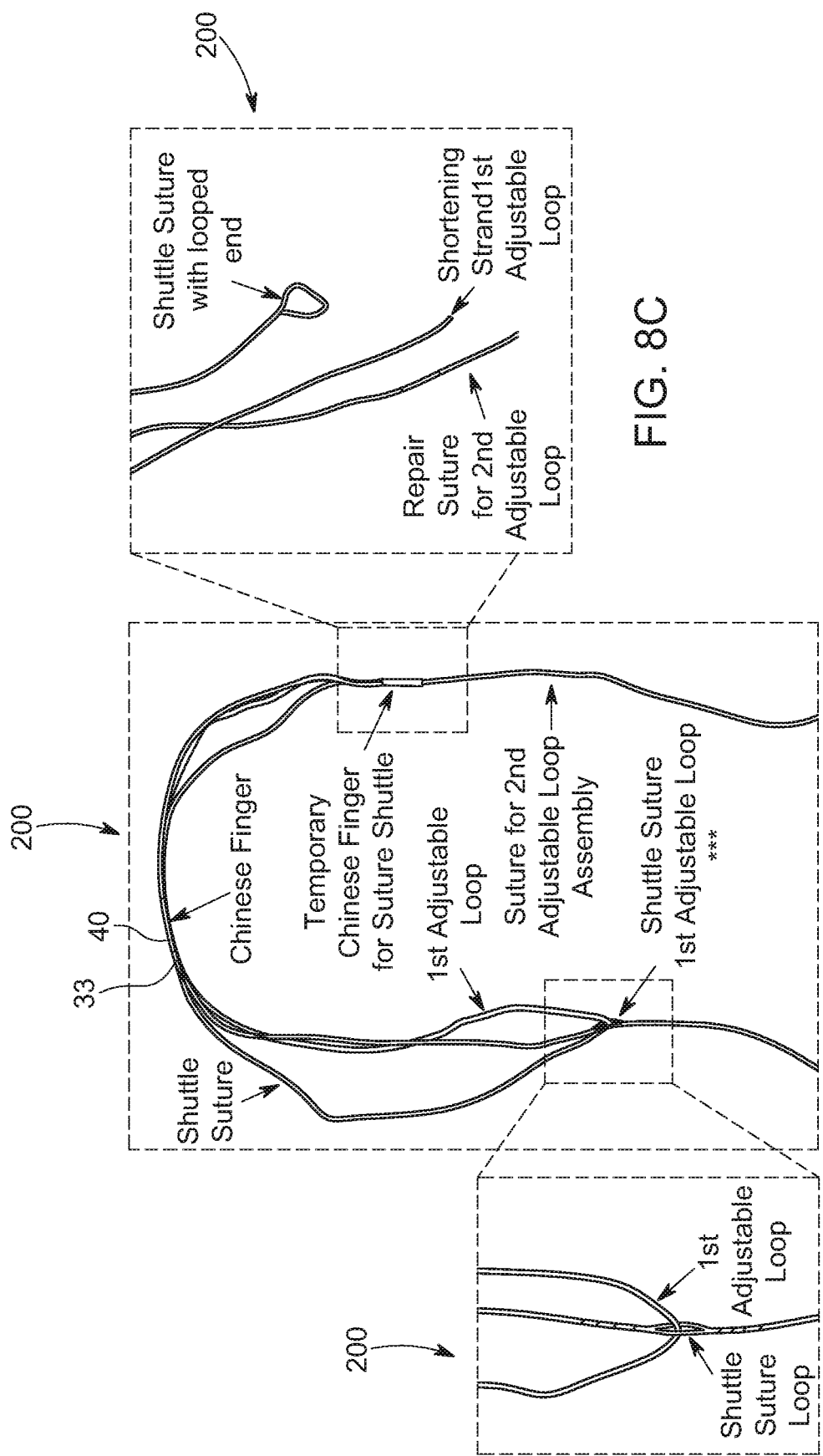

1. Shuttle suture passing through the meniscus using the Viper

2. Repair suture transfer through the meniscus with the Chinese Finger Trap positioned towards the capsule 3. 2$^{nd}$ repair suture shuttle through the meniscus using the Viper 4. Final repair situation after repair suture shuttle with the Chinese Finger Trap on the capsule side

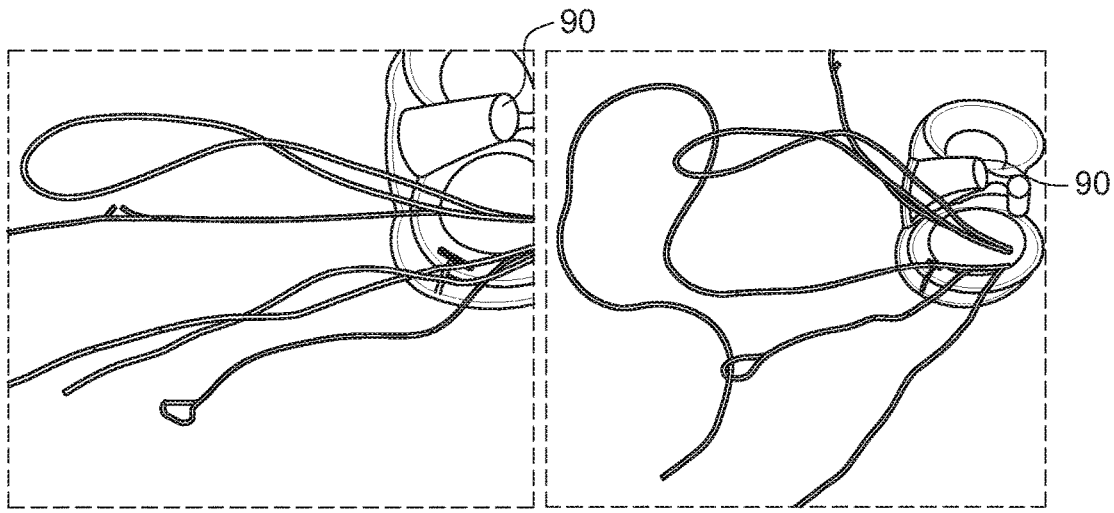
5. Adjustable and shuttle suture release
FIG. 11E
6. Repair suture transfer through the 1st adjustable and shuttle suture loop
FIG. 11F
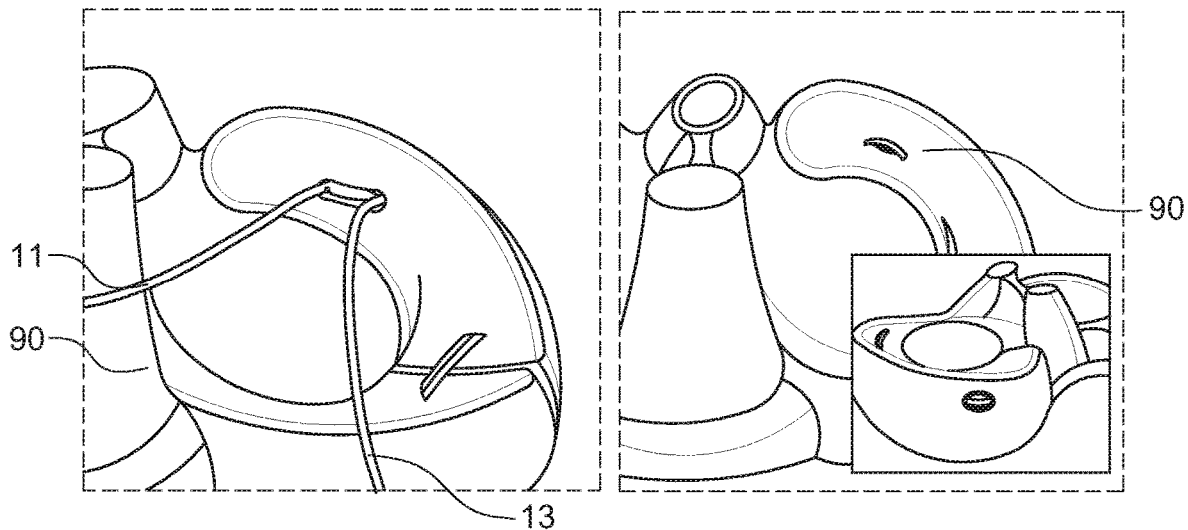
7. Repair suture transfer through the Chinese Finger for 2nd loop shortening and tensioning with subsequent suture cutting
FIG. 11G
8. Final repair situation
FIG. 11H 1. Shuttle suture passing through the meniscus using the scorpion 2. Repair suture pass through the meniscus 3. 2nd repair suture pass through the meniscus using the scorpion 4. Repair suture after suture shuttle with the Chinese Finger trap portion positioned towards the tibia plateau 5. Cute the shuttle suture loop for 1st adjustable loop release and extract sutures from the temporary Chinese finger portion 6. Repair suture transfer through the 1st adjustable and shuttle suture loop 7. Repair suture transfer through the Chinese Finger for loop shortening and tensioning with subsequent suture cutting 8. Final repair situation

KNOTLESS ALL-INSIDE SUTURE CONSTRUCTS AND METHODS OF TISSUE FIXATION

BACKGROUND

The disclosure relates to surgical devices and, more specifically, to knotless, self-locking constructs and associated methods of tissue repairs.

SUMMARY

Knotless, all-inside, self-locking anchor constructs and methods of tissue repairs are disclosed. A self-locking construct can create a knotless, all-inside, self-locking repair. A self-locking construct can include (i) an adjustable, closed, flexible, continuous loop; (ii) a loop interconnection; and (iii) a locking mechanism.

An adjustable, closed, flexible, continuous loop can have an adjustable perimeter and/or length. A locking mechanism can be located between an adjustable, closed, flexible, continuous loop formed by a single flexible strand and two flexible terminal ends of the strand. A loop interconnection can be in the form of an interconnecting loop link. A locking mechanism can be any friction-based mechanism such as a Chinese finger trap, or a loop shortening mechanism in the form of a flexible coupler with at least one weave region having a plurality of locking points. A weave region can have an accordion/pleated configuration.

An all-inside, self-locking construct can be knotless and tensionable. An all-inside self-locking construct may be employed to re-attach anatomical structures, for example, a first tissue to a second tissue, such as soft tissue, tendon, ligament, and/or bone, to each other and/or any combination of one another, by employing an all-inside, self-locking, knotless mechanism. An all-inside, self-locking construct may be employed as a stand-alone construct or with additional fixation devices, for example, attached to one or more buttons.

A self-locking mechanism and implant construct for all-inside, self-locking repairs such as knotless attachment of first tissue to second tissue (for example, meniscal repairs or attachment of soft tissue to bone) is disclosed. The implant construct may be an orthopedic implant construct. The construct can be formed of (and formed from) one single continuous flexible strand. Two terminal ends are sequentially run through a locking mechanism (a Chinese finger trap or a flexible coupler such as suture tape or suture ring, for example) to form two interconnected, flexible, continuous, knotless, closed, adjustable loops, each having an adjustable perimeter.

In an embodiment, a first terminal end of a flexible strand is woven through a flexible coupler (which can be in the form of a suture tape or suture ring, for example) of a locking mechanism, to form a first flexible loop. The first terminal end is passed through the flexible coupler in one direction and multiple times, to form a first accordion-style weave that creates multiple locking points to lock the first flexible loop. The second terminal end is passed through the first flexible loop (to form a loop interconnection or an interconnecting loop link) and then through the flexible coupler in the same direction and multiple times, to form a second flexible loop and a second accordion-style weave that creates multiple locking points to lock the second flexible loop. Both ends then exit the flexible coupler. The construct can be shrunk when both terminal ends are pulled. The construct can be attached to one or more fixation devices (for example, implant, anchor, screw, plate, button, etc.). A flexible strand can be suture or suture tape, or combination of suture and suture tape. A first flexible loop can be a continuous, adjustable, knotless, closed loop with adjustable perimeter. A second flexible loop can be a continuous, adjustable, knotless, closed loop with adjustable perimeter.

In another embodiment, both terminal ends are passed through a flexible coupler in the form of coreless braid or sleeve (similar to a Chinese finger trap) to form a locking mechanism. A flexible strand may be suture or suture tape, ribbon, or any combination thereof (e.g., round and flat suture).

The flexible strand can create at least two interconnected, flexible, continuous, adjustable, knotless, closed loops with adjustable perimeters. A terminal end is each run through the flexible coupler of the locking mechanism in an accordion/pleat weave and/or Chinese trap fashion, to complete the loops and to create friction locking points. The implant may be secured to tissue. Tension may then be applied to the terminal ends to shrink/close the loops bringing the tendon/ligament/and/or soft tissues together while locking the construct in place. An all-inside, self-locking, knotless construct may be attached to one or more fixation devices, for example, anchors, screws, implants, buttons, etc. At least one of the buttons may be an implantable button or a cortical button.

Methods of all-inside, self-locking tissue repairs are also disclosed. A first tissue is approximated to a second tissue with an all-inside, self-locking, knotless surgical construct that includes a tensionable construct with a self-locking mechanism. In an embodiment, a flexible strand forms at least two interconnected, flexible, continuous, knotless, closed, adjustable loops having adjustable perimeters and/or lengths. Each loop can be formed by passing/weaving a terminal end of a flexible strand through a flexible coupler of a locking mechanism (which may be integral to the flexible strand or provided as a separate structure from the flexible strand) multiple times to each form an accordion-style weave region that creates multiple locking points to lock each of the two flexible loops. Both ends exit the flexible coupler. The construct may be shrunk when both terminal ends are pulled. A locking mechanism may be a suture locking mechanism. A flexible coupler may be a Chinese finger trap, a loop shortening mechanism, or any friction-based mechanism that allows the formation and secure locking of a suspensory construct (single-suture anchor) with an adjustable loop length. A flexible coupler may be provided integral to the flexible strand or provided as a separate structure from the flexible strand.

BRIEF DESCRIPTION OF THE DRAWINGS

FIG. 3 shows a basic suture configuration before assembly of the all-inside, self-locking, knotless construct of FIG. 1.

FIGS. 4(A)-(F) illustrate assembling steps for the all-inside, self-locking, knotless construct of FIG. 1.

FIGS. 8(A)-(C) illustrate another all-inside, self-locking, knotless construct (illustrating the suture configuration and detailed illustrations (left, right) for knotless soft tissue repairs).

FIGS. 11(A)-(H) illustrate subsequent steps of an exemplary method of tissue repair (meniscal repair) with an all-inside, self-locking, knotless construct.

DETAILED DESCRIPTION

Figure 2:
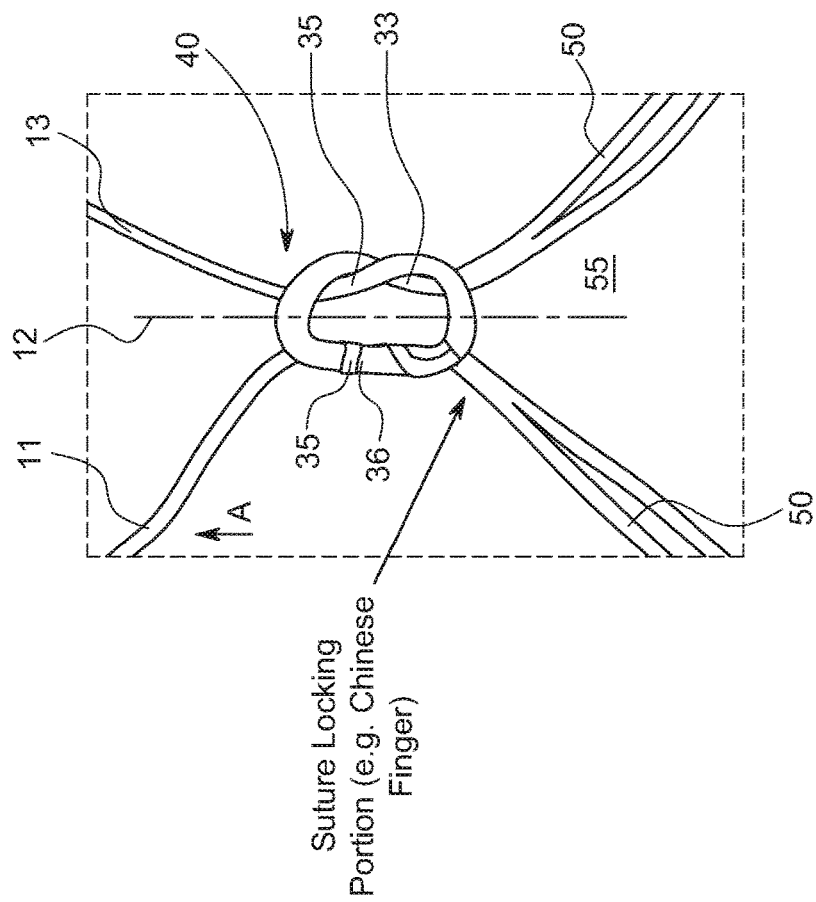
FIG. 2 illustrates an enlarged view of the locking mechanism of the all-inside, self-locking, knotless construct of FIG. 1.

Current arthroscopically suture-based soft tissue devices for tissue repairs (for example, meniscal repairs) are based on hybrid implant technology, containing anchoring devices that are made of soft/solid materials and an interconnecting suture loop. After anchor deployment through the torn meniscus, the interconnected suture loop is shortened and, thus, tension is optimized to finalize the soft tissue fixation by cutting of the proximal suture ends. Anchors sitting on the joint capsule and a pre-tied sliding knot on the suture side allow for securing/finalizing the final repair.

Recently, a new generation of all-inside suture-based arthroscopic soft tissue repair devices has been developed. The new-generation devices pass a suture vertically/horizontally through the torn meniscus, thereby encircling the tear without additional extra-capsular anchors. The fixation is finalized by adding arthroscopically-formed knots and creating a continuous suture loop.

The present disclosure provides all-inside, suture-based arthroscopic soft tissue repair devices/constructs and associated methods for encircling tissue (for example, a torn meniscus) by passing suture vertically/horizontally through a torn meniscus with knotless fixation of the created continuous suture loop. The final tension is achieved by loop shortening and utilization of a friction-based mechanism (such as Chinese finger trap technology) that gains tissue compression without the use of a pre-tied sliding knot or arthroscopically tying. A knotless device can reduce failure modes to the suture material or meniscal tissue, instead of having a weak knot security with resulting loop lengthening.

All-inside, suture-based, arthroscopic soft tissue repair devices/constructs of the present disclosure can be employed for surgical repairs such as, for example, knee ACL reconstruction, meniscal root repair, labrum repair fixation to the glenoid, syndesmotic fixation of the ankle, AC joint reconstruction of the shoulder, etc. Additionally, all-inside all-suture based arthroscopic soft tissue repairs may add functions by interconnecting two knotless repair devices (similar to FiberTag™/SutureTag™ suture loop devices). Multiple adjustments of the final tension can also allow for a more flexible intraoperative handling, as well as achieving more reproducible tensioning of the e.g. torn meniscus. Flexible tensioning in the final step enables the surgeon to standardize the construct security. The creation of a continuous comprehensive suture loop over the entire thickness of the meniscus offers greater holding strength to maximize the load to failure and response to cyclic loading.

The disclosure provides surgical all-inside, self-locking adjustable loop constructs; all-inside, self-locking suture loop mechanisms; and methods for securing a first tissue to a second tissue (for example, soft tissue to bone, or bone to bone) with an all-inside, self-locking, knotless construct including at least two adjustable, knotless, flexible, closed loops and a self-locking mechanism. The tensionable construct is a locking mechanism/construct that includes at least two adjustable, knotless, flexible, continuous, closed loops and has the ability to secure a first tissue to a second tissue without any knots and in an all-inside manner. The surgical constructs include a self-locking tensionable construct that can be further attached to one or more fixation devices, for example, one or more anchors, implants, buttons, screws, plates, etc., or combinations thereof.

The disclosure provides round to flat suture technology that allows: combination of suture tape and round Chinese finger trap portions; a single suture construct; no independent anchor body; use with knotless adjustable loop length cortical button devices, fixed loop devices, InternalBrace™ ligament augmentation repair, etc.

The single-suture anchor with suspensory adjustable loop length fixation of the present disclosure may be employed in various surgical applications, for example, AC joint repair, meniscal root repair, syndesmosis tenodesis, InternalBrace™ ligament augmentation repair for elbow/AC joint; ACL repair (InternalBrace™ ligament augmentation repair); ACL reconstruction (InternalBrace™ ligament augmentation repair); MCL reconstruction (InternalBrace™ ligament augmentation repair); MPFL reconstruction (InternalBrace™ ligament augmentation repair); and posteriolateral corner, among many others.

The construct may be formed of one single continuous flexible strand or flexible member in the form of suture, round, and/or flat suture. Two terminal ends of the flexible strand are run in same direction and about parallel to each other through a flexible coupler of a locking mechanism (such as a Chinese finger trap; a flat suture tape; a suture ring, etc.) to form two suture loops that are interconnected. The terminal ends can be woven through the flexible coupler in an accordion/pleat weave manner at multiple locking points. Alternatively, the terminal ends can be passed through a channel of a coreless braid or sleeve (in a Chinese finger trap fashion) to lock the two suture loops. Both ends exit the flexible coupler. The construct can be shrunk when the terminal ends are pulled.

Methods of all-inside, knotless, self-locking tissue repairs are also disclosed. In an embodiment, at least one flexible strand is looped to form a self-locking loop construct with at least two knotless, continuous, flexible, closed adjustable loops having an adjustable perimeter; a loop interconnection connecting the at least two knotless, continuous, flexible, closed adjustable loops; and two terminal ends. In an embodiment, each terminal end is passed through different points spaced apart a length of a flexible coupler (such as a flat suture tape or suture ring, for example) of a locking mechanism and a distance away from the loop interconnection, to form first and second pleat/accordion weave regions with first and second pluralities of locking points, respectively. The terminal ends can be slidably passed through the flexible coupler. The terminal ends can be passed through the flexible coupler at different separate points, beginning with a first point and then passing the terminal end through another, second point (at a position adjacent the first point) to form the first and second loops and the first and second pleat/accordion weave regions with the first and second plurality of locking points. When the terminal ends are pulled, the construct shrinks, for example, the perimeters of the first and the second loops decrease. The distance between the first and second locking points may also decrease.

In another embodiment, each terminal end is passed through longitudinally extending channel of a coreless braid or sleeve (in the form of a Chinese finger trap or any similar friction-based mechanism). When the terminal ends are pulled, the braid shrinks. The tension reduces the radial distance between opposing sides of the braid and, thus, reduces its overall circumference, which in turn traps and tightens around the flexible strand. The tensionable construct allows the user (for example, surgeon) to control the tension of the flexible coupler on first tissue (for example, soft tissue) to be attached to a second tissue (for example, bone).

The surgical constructs and methods of the present disclosure provide all-inside, self-locking mechanisms and surgical constructs, as well as methods for all-inside tissue repairs, for example, attachment of a first tissue to a second tissue, such as soft tissue to bone, with such constructs.

Referring now to the drawings, where like elements are designated by like reference numerals, FIGS. 1-10(C) illustrate various structural components of all-inside, self-locking, knotless construct 100, 200 (surgical construct 100, 200; knotless, all-inside single suture anchor 100, 200; knotless, all-inside suture soft tissue repair device 100, 200; single suture anchor with suspensory adjustable loop length fixation 100, 200) that may be employed by itself or in conjunction with additional fixation devices, for example, anchors, implants, or buttons, to form surgical constructs. FIGS. 11(A)-(H) and 12(A)-(H) illustrate steps of various methods of tissue repair with the surgical constructs of the disclosure.

All-inside, self-locking, knotless construct 100 can be formed of one single continuous flexible strand 10 (flexible material 10; suture 10; flexible tape 10; round suture/flat tape 10) in the form of suture, either round and/or flat suture, for example, suture tape, or combination of round suture and flat suture tape. The flexible strand 10 is provided with two terminal ends, a first end 11 and a second end 13. The two terminal ends 11, 13 are run in a same direction through a locking mechanism 40 (suture locking mechanism 40; securing mechanism 40; suture locking portion 40; anchor portion 40) to form at least two suture loops 50.

Figure 1:
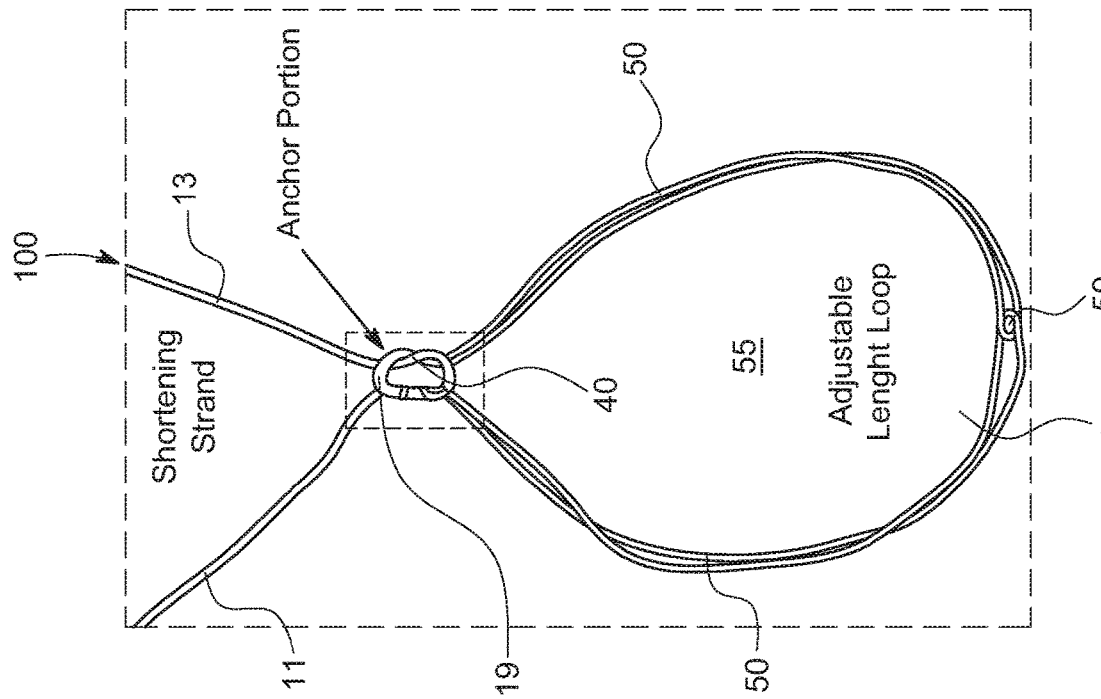
FIG. 1 illustrates an all-inside, self-locking, knotless construct.
Figure 5C:
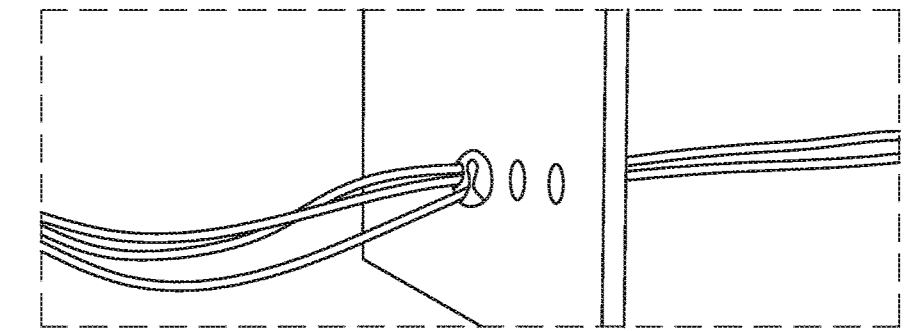
FIGS. 5(A)-(E) illustrate subsequent steps for locking and tensioning (proof of concept) the all-inside, self-locking, knotless construct of FIG. 1.
Figure 5B:
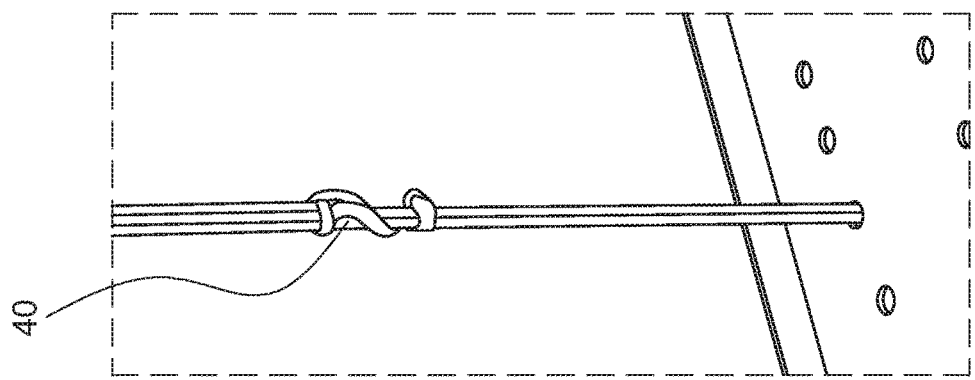
Figure 5A:
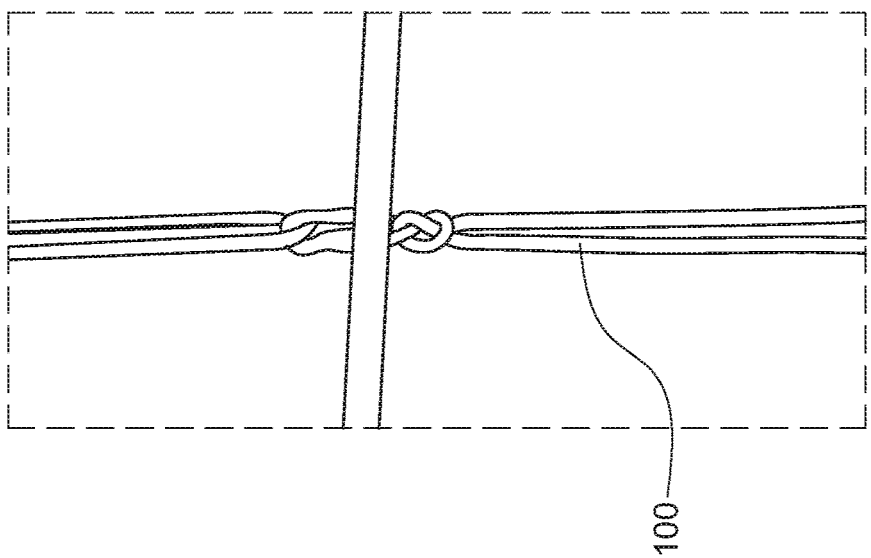
Figure 5E:
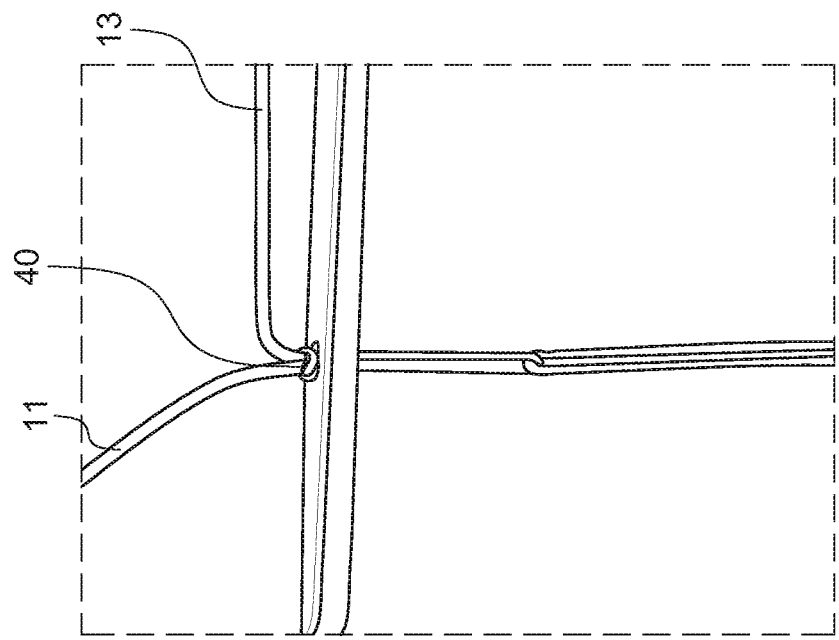
Figure 5D:
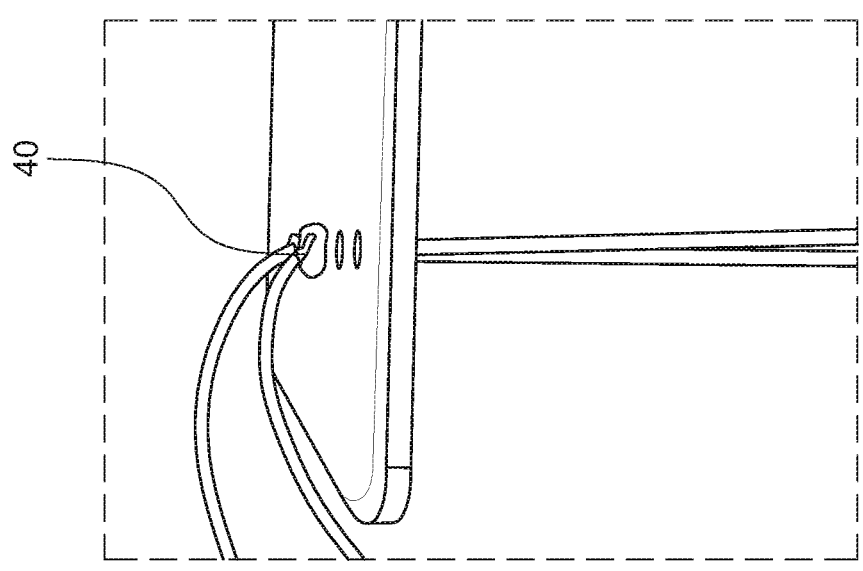
Figure 6A:
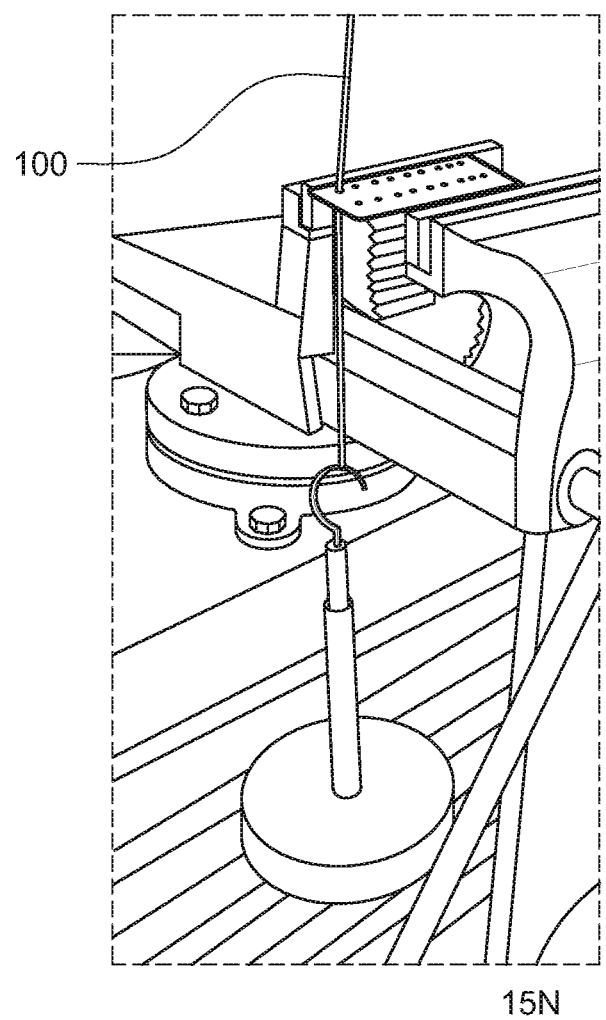
FIGS. 6(A)-(D) illustrate subsequent steps for primary anchor deployment of the all-inside, self-locking, knotless construct of FIG. 1.
Figure 6B:
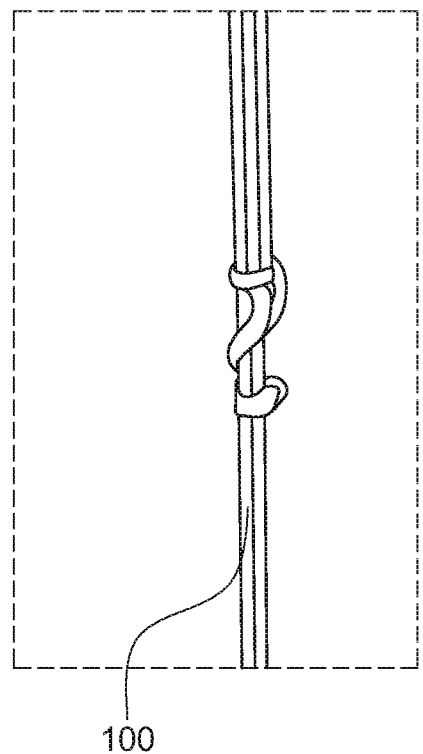
Figure 6C:
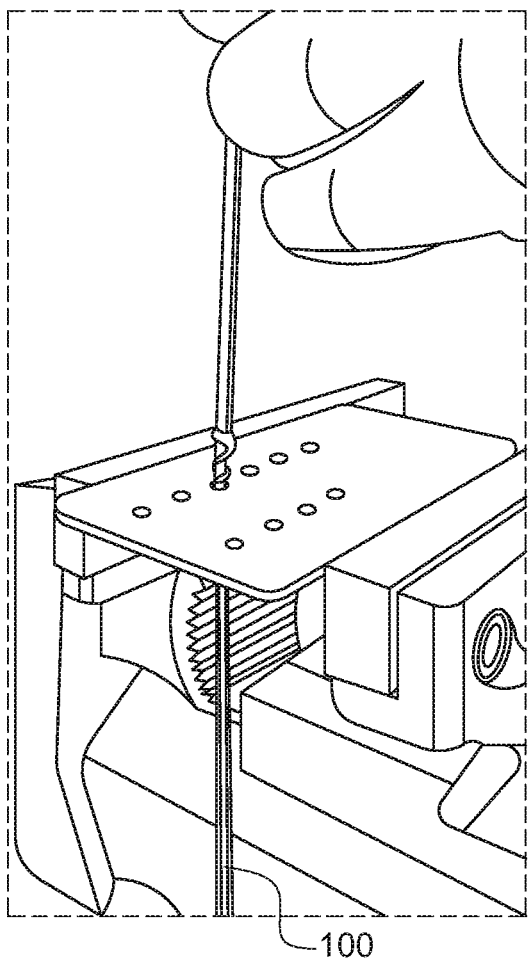
Figure 6D:
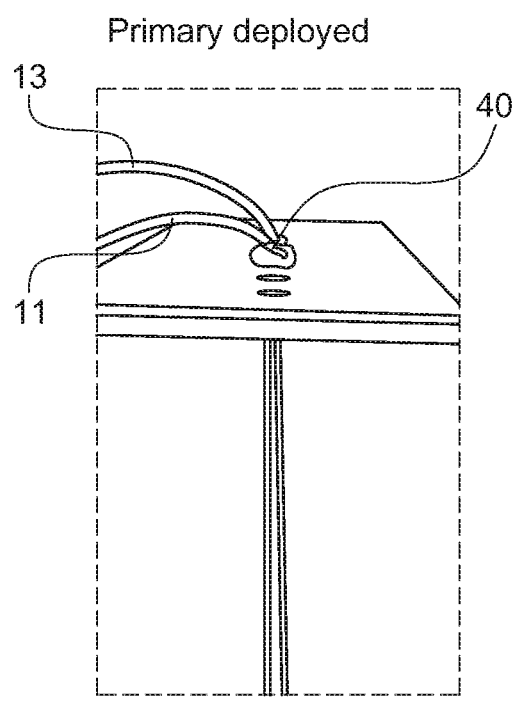
Figure 7C:
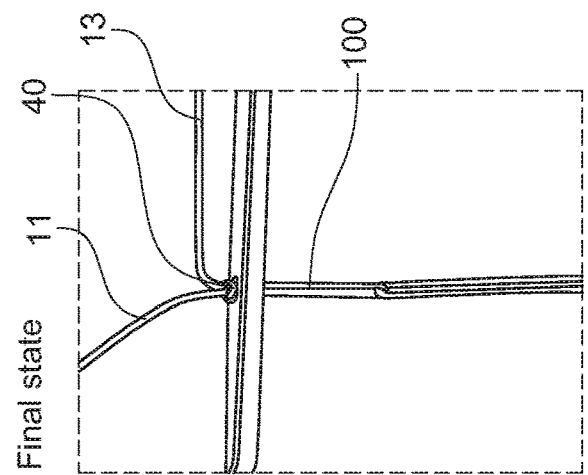
FIGS. 7(A)-(C) illustrate subsequent steps for loop shortening of the all-inside, self-locking, knotless construct of FIG. 1.
Figure 7B:
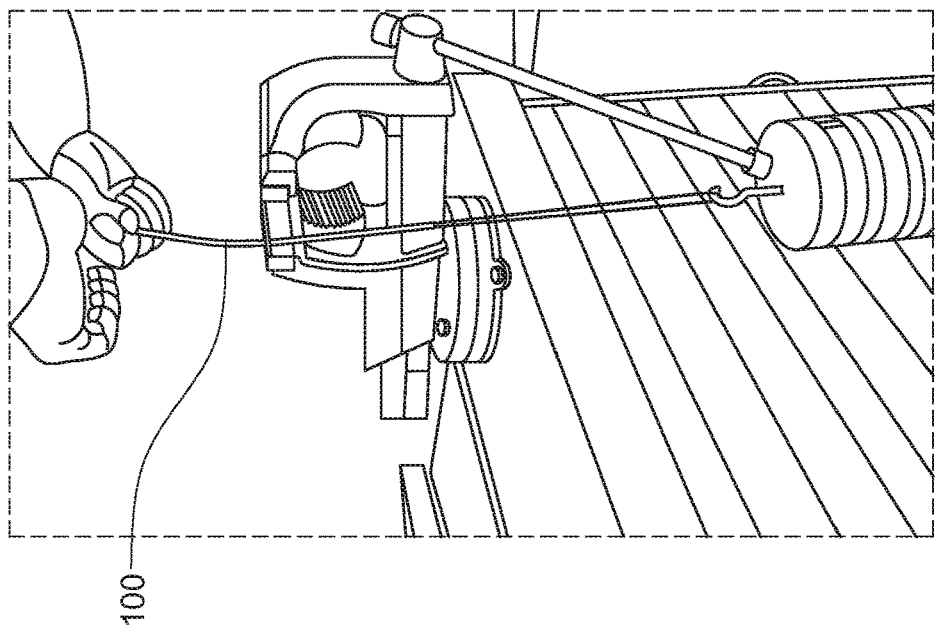
Figure 7A:
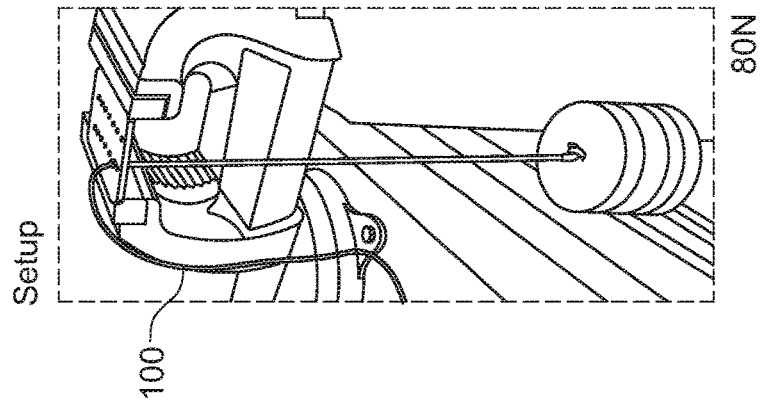
Figure 9:
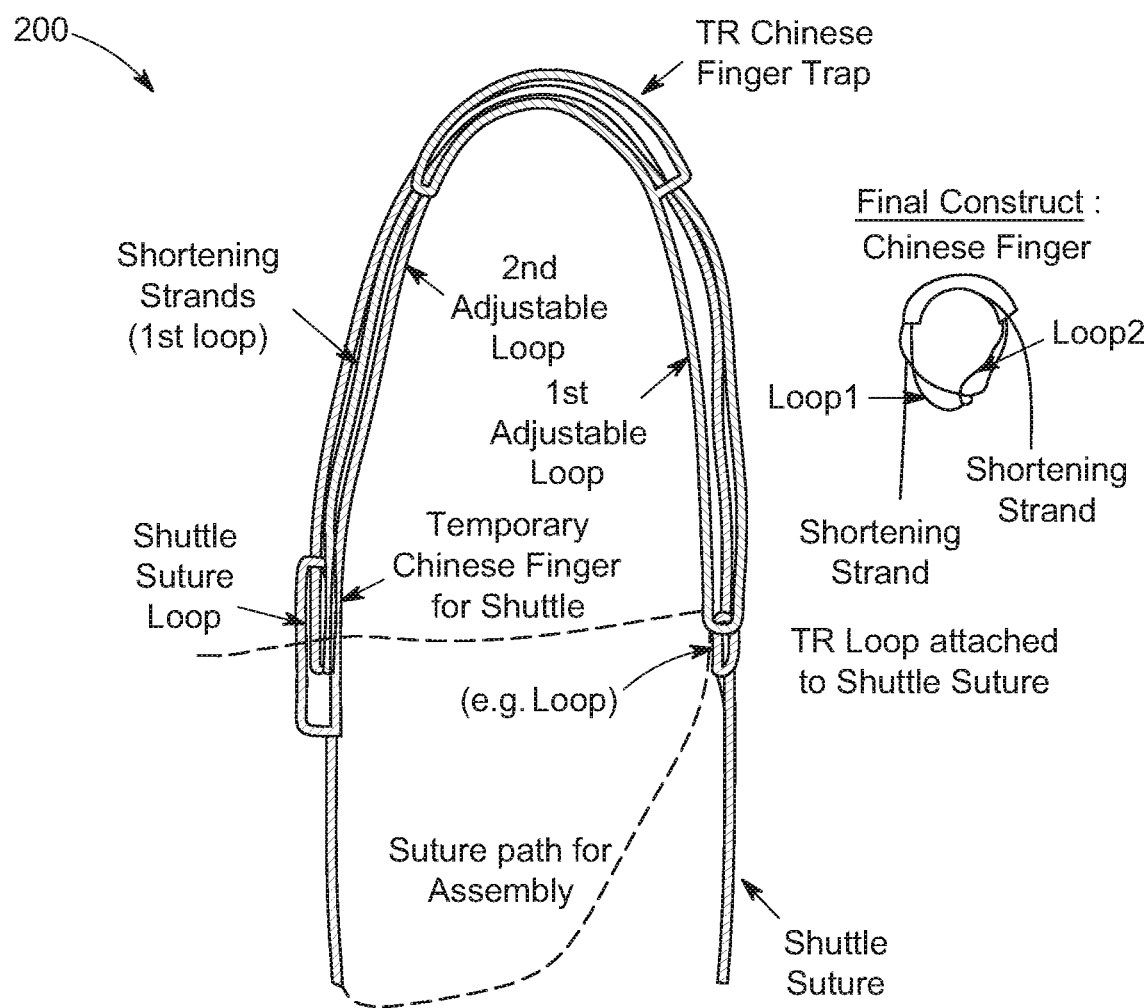
FIG. 9 illustrates another view of an all-inside, self-locking, knotless construct.

The all-inside, self-locking, knotless construct 100 shown in FIG. 1 also includes interconnection 59 (interconnecting loop link 59; loop interconnection 59; intertwined region 59, linkage 59; loop connecting region 59) formed by interconnecting the two suture loops 50 to form a single, closed, adjustable, knotless, self-locking loop 55 having an adjustable perimeter and/or length. The at least two loops 50 are also flexible, closed, knotless, continuous, adjustable loops each having an adjustable length. Interconnection 59 is located at one end of the construct, for example, at a first loop end 17 (FIG. 1).

Locking mechanism 40 (suture locking mechanism 40; securing mechanism 40; suture locking portion 40; anchor portion 40) is shown in enlarged view in FIG. 2. Locking mechanism 40 can be a suture locking mechanism. Locking mechanism 40 can include any friction-based mechanism or loop shortening mechanism that allows an all-inside, knotless fixation of the final construct. In an embodiment, locking mechanism 40 can include a Chinese finger trap 33 in the form of an exemplary cylindrical, helically wound braid, such as a biaxial braid. Tension in the biaxial braid reduces the radial distance between opposing sides of the braid and, thus, the overall circumference to allow trapping of the flexible strand and tightening of the braid around the flexible strand (to lock the flexible strand).

In another embodiment, locking mechanism 40 can include a flexible coupler 33 in the form of a suture tape or suture ring (or similar structure), that allows passing of the suture ends through the material of the flexible coupler, at a plurality of locking points, to form first and second pleat/accordion weave regions within the flexible coupler, and as detailed below.

Reference is now made to FIGS. 4(A)-(F) which illustrate subsequent steps for forming all-inside, self-locking, knotless construct 100 of FIG. 1. As shown in more detail in FIGS. 4(A)-(F), one of the free ends, for example, free terminal end 11 is passed through the flexible coupler 33 at least once (for example, five times at five different points) along longitudinal axis 12 of the flexible coupler 33, and in direction A (FIG. 4(C)), to form first accordion style weave region 35 can include a plurality of folds and/or weaves, the folds having uniform or non-uniform configuration and dimensions and first adjustable, closed, knotless, flexible loop 50.

The other terminal end, for example, free terminal end 13 is passed through the first adjustable, closed, knotless, flexible loop 50, and also passed through the flexible coupler 33 at least once (for example, multiple times) also along longitudinal axis 12 (FIG. 2) of the flexible coupler 33 and in a direction parallel to direction A, and in same sense/direction, to form second accordion style weave region 35 and interconnection 59 (interconnecting loop link 59; loop interconnection 59; intertwined region 59, linkage 59; loop connecting region 59). Each free terminal end 11, 13 can be passed from a first surface of the flexible coupler 33 to a second, opposite surface of the flexible coupler 33, and for a plurality of times, to form a plurality of locking points 36 of the first and second accordion style weave regions 35.

The multiple locking points 36 of the locking mechanism 40 lock the two suture loops 50 and the adjustable length loop 55. As detailed below, the locking mechanism 40 also acts as an anchor portion of the surgical construct.

Both ends 11, 13 exit the flexible coupler 33 of the locking mechanism 40 at a second loop end 19 (FIG. 1). The all-inside, self-locking, knotless construct 100 can be shrunk when both terminal ends 11, 13 are pulled to decrease the perimeter of at least one of the flexible, closed, knotless, adjustable loops 50 and subsequently that of the flexible, closed, knotless, adjustable loop 55.

FIGS. 8(A)-(C) and 9 illustrate all-inside, self-locking, knotless construct 200 which is about similar to the all-inside, self-locking, knotless construct 100 described above, in that it is also a tensionable, all-inside, knotless construct provided with two flexible, closed, knotless, continuous, adjustable loops 50 that are connected by interconnection 59 to form a single, closed, adjustable, knotless, self-locking loop 55 having an adjustable perimeter and/or length. The all-inside, self-locking, knotless construct 200 differs, however, from construct 100 in that locking mechanism 40 includes a Chines finger trap 33 (or a similar friction-based mechanism) in lieu of the flexible coupler 33. The Chinese finger trap 33 allows final tension to be achieved by loop shortening and utilization of a friction-based mechanism that gains tissue compression without the use of a pre-tied sliding knot or arthroscopically tying.

The terminal ends 11, 13 may be slidably passed through a longitudinal channel of the locking mechanism 40. Alternatively, the terminal ends may be passed through the flexible coupler of the locking mechanism 40 at different separate points, beginning with a first point and then passing the terminal end through another, second point (at a position adjacent the first point) to form the first and second loops and the first and second pleat/accordion weave regions with the first and second plurality of locking points. When the terminal ends are pulled, the construct shrinks, for example, the perimeters of the first and the second loops decrease. The distance between the first and second locking points may also decrease.

Figure 10A:
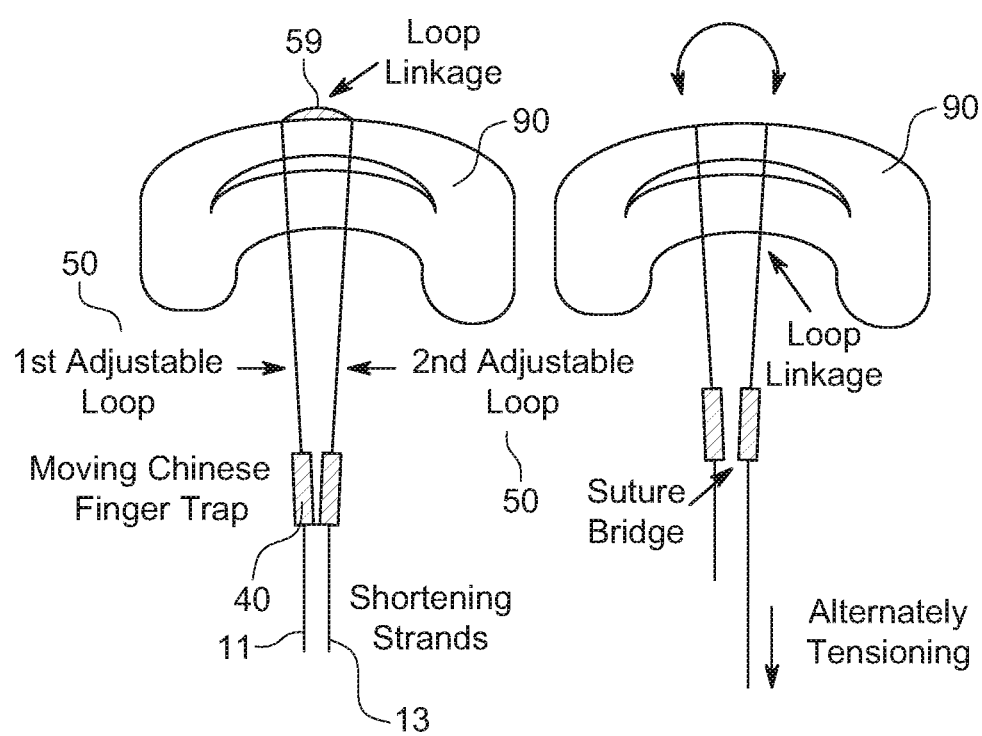
FIGS. 10(A)-(C) illustrate schematic steps of a meniscal repair with an all-inside, self-locking, knotless construct.

FIG. 10A illustrates a knotless construct at a surgical site of meniscal repair 90, with loop interconnection 59 positioned over the meniscus on the capsule side. Alternating loop linkage transfer through the meniscus during ABS TightRope® construct loop shortening results in cutting effects (damage) and higher frictional force within the suture-soft tissue interface.

Figure 10B:
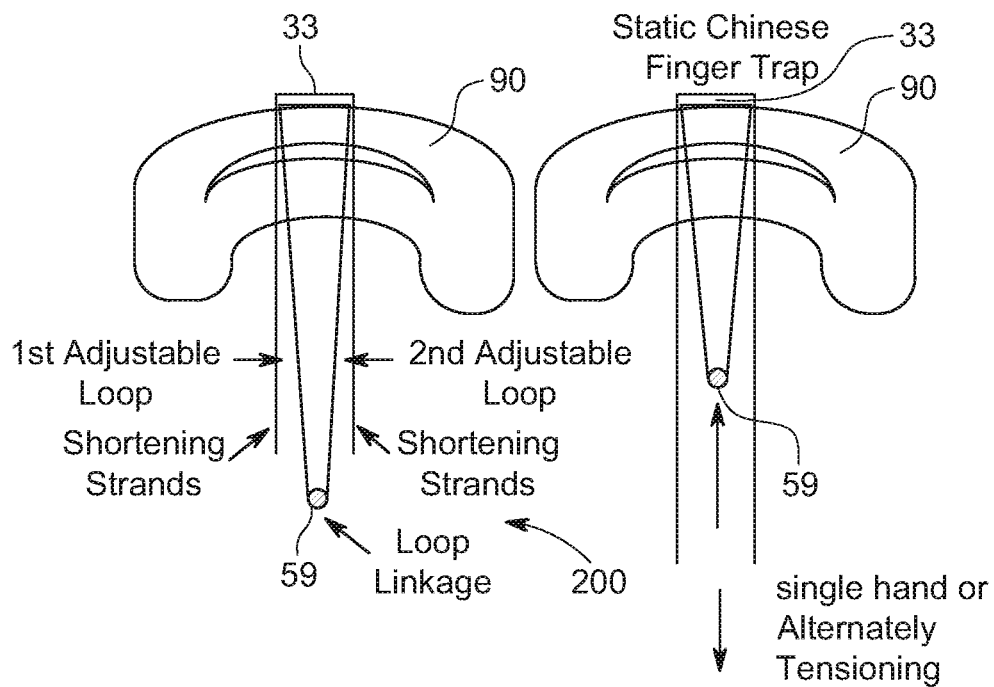
Figure 10C:
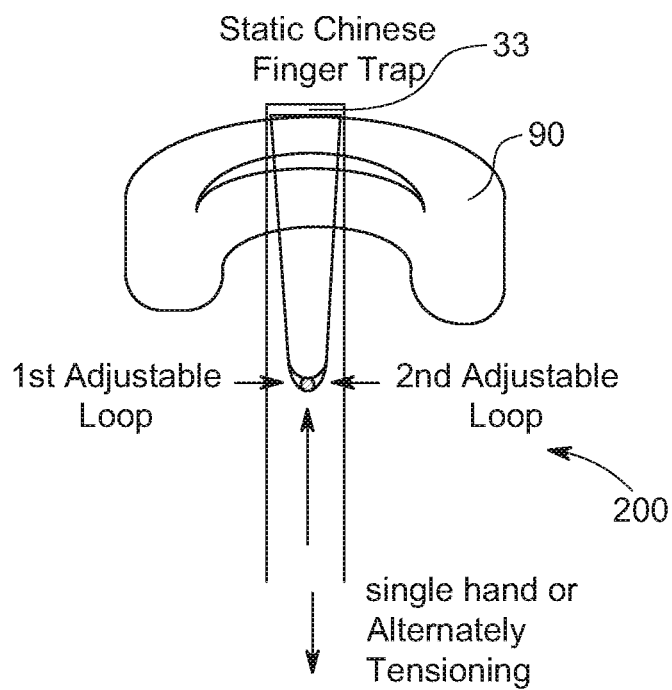
Figure 11A:
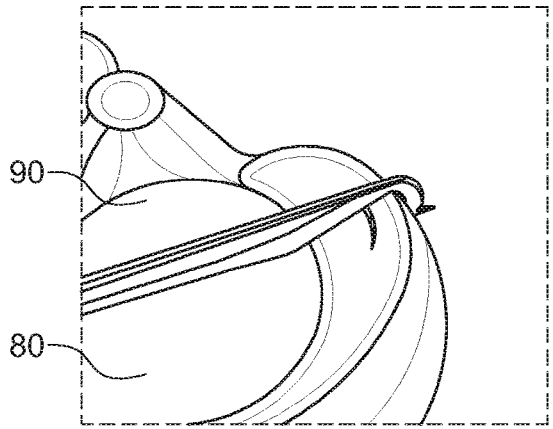
Figure 11B:
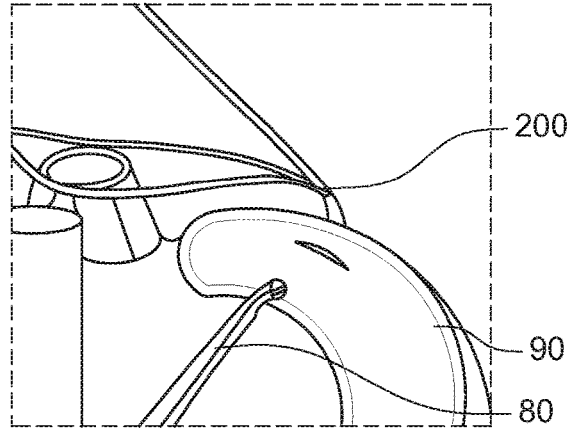
Figure 11C:
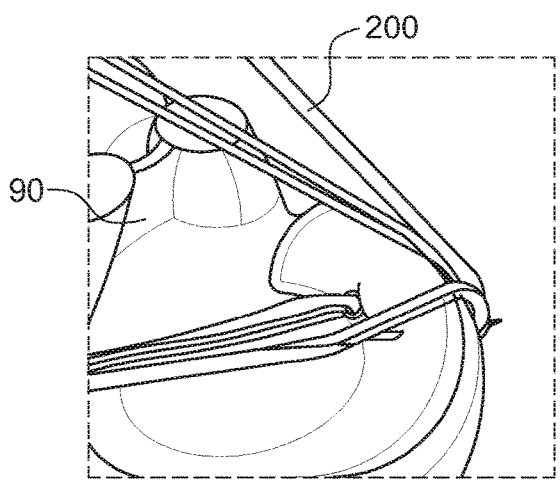
Figure 11D:
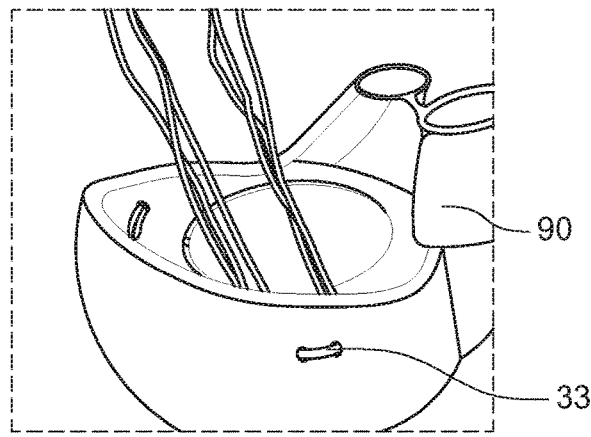
Figure 12A:
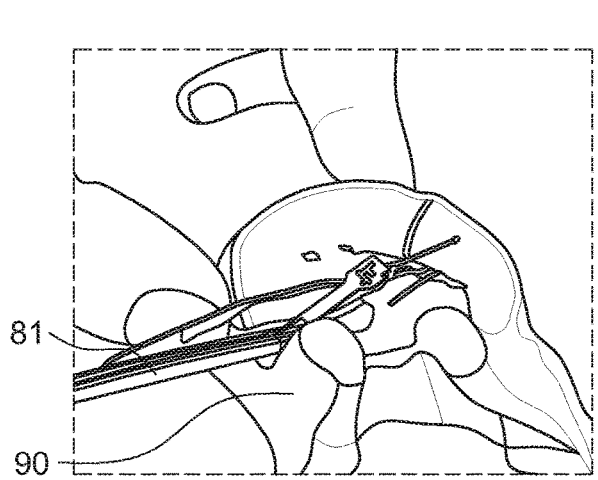
FIGS. 12(A)-(H) illustrate subsequent steps of another exemplary method of tissue repair (meniscal repair) with an all-inside, self-locking, knotless construct.
Figure 12B:
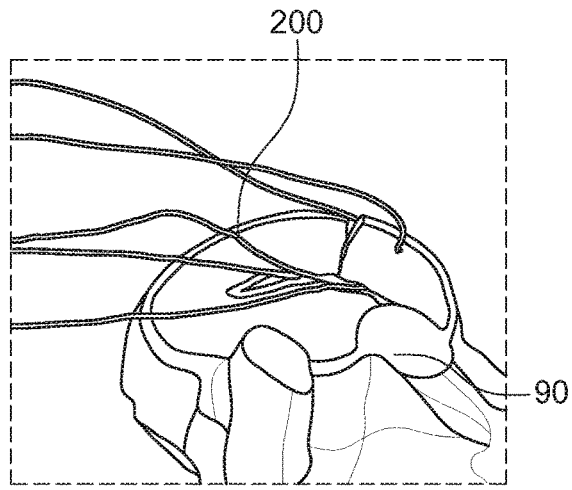
Figure 12C:
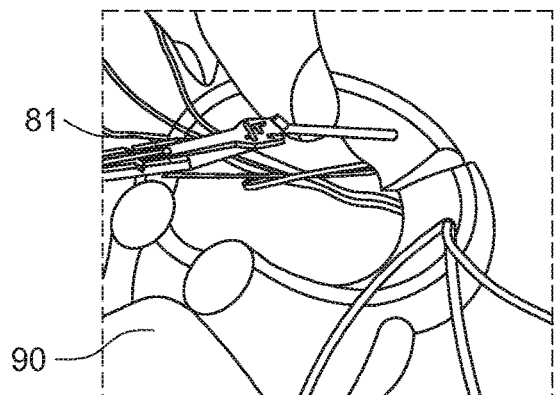
Figure 12D:
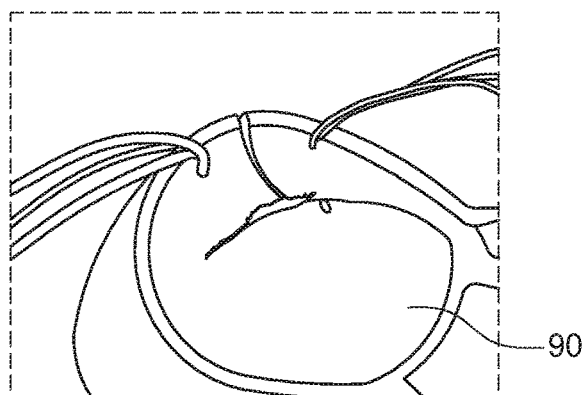
Figure 12E:
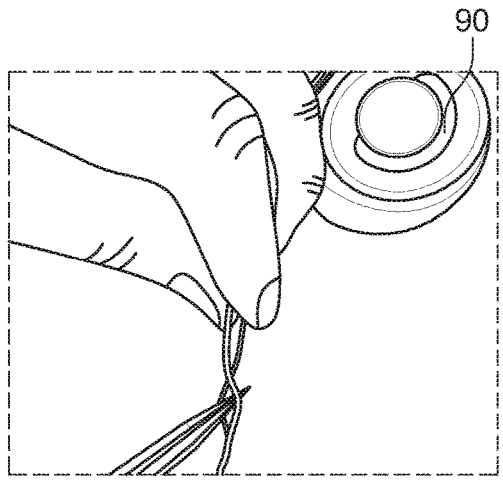
Figure 12F:
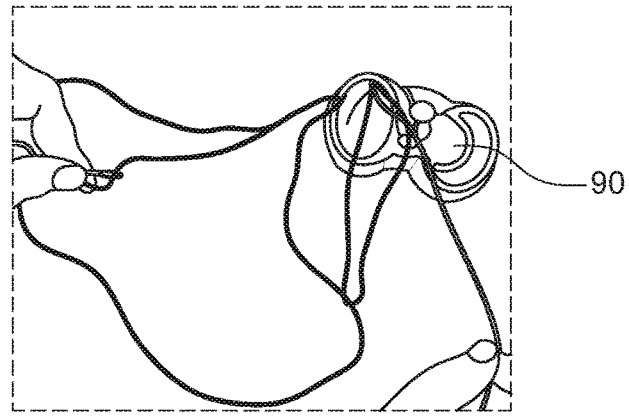
Figure 12G:
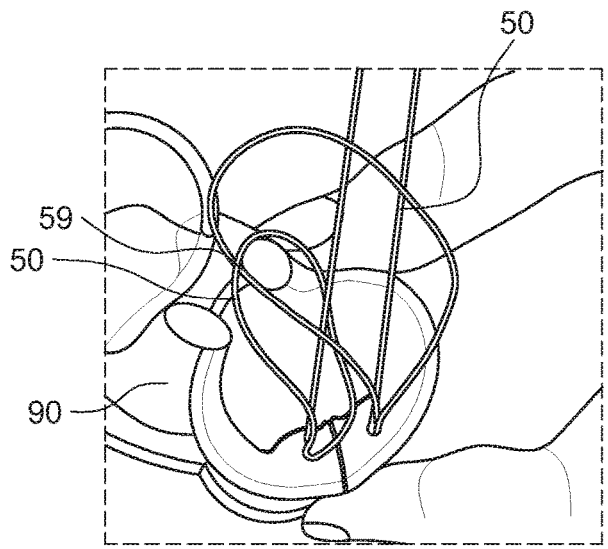
Figure 12H:
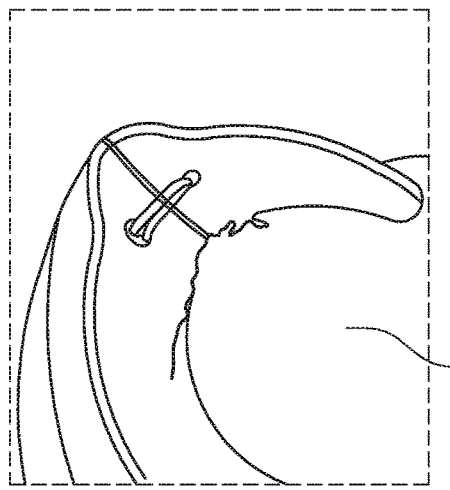

FIGS. 10B and 10C illustrate the Chinese finger trap of the new device 200 within the meniscus (positioned over the capsule side) which serves as protection sleeve and static counter bearing during loop shortening and protects the soft tissue of higher forces and relative motions to the suture.

The design and handling advantages of the new device 100, 200 over the standard ABS TightRope® construct are as follows:

Shortening strands of the ABS TightRope® implant share equally the Chinese finger trap portion, whereas both shortening strands of the new device are secured in a single, larger Chinese finger trap leading to higher fixation strength.

The ABS TightRope® implant alternately transfers the loop linkage through the meniscus with the Chinese finger transferred to the soft tissue. The Chinese finger trap of the new device works as static counter bearing during loop shortening with the loop linkage approximated to the soft tissue. A single Chinese finger portion as static counter bearing provides:

Reduced relative motion between repair suture and soft tissue during the shortening;

Works as protection sleeve for the soft tissue by reducing cutting effects of moving sutures to the soft tissue;

Less friction induced forces by internal running shortening sutures within the Chinese finger trap;

Continuous single hand-pull loop shortening of both loops with equal tension on each shortening strand with less confusing suture management;

Enables an absolute shorter minimum loop length due to a missing suture bridge portion between two separate Chinese finger traps;

Both repair suture ends can be shuttled for horizontal/radial soft tissue repair using the Scorpion™/Viper™ suture passer in the same intended passing direction without flipping the passing instrument or passing direction; and The new device including the interconnecting loop link (FIG. 10(B)) equally distributes applied tension between both adjustable loops.

FIGS. 11(A)-(H) illustrate subsequent steps of an exemplary method of tissue repair (such as meniscal repair) with one or more all-inside, self-locking, knotless constructs 100, 200. The steps are conducted with horizontal suture repair and with gradual surgical technique steps using an exemplary suture passer 80 such as Arthrex Viper™ suture passer. The steps include the positioning of the repair suture through the meniscus 90 with the locking mechanism 40 (with a flexible coupler or Chinese finger trap 33) positioned on the capsule side; passing of a suture end through the first suture loop and then through the locking mechanism to form a second suture loop interconnected to the first suture loop); loop shortening and tensioning; and subsequent suture cutting.

FIGS. 12(A)-(H) illustrate subsequent steps of another exemplary method of tissue repair (such as meniscal repair) with one or more all-inside, self-locking, knotless constructs 100, 200. The steps are conducted with radial suture repair and with gradual surgical technique steps using an exemplary suture passer 81 such as Arthrex Scorpion™ suture passer and the suture configuration of a knotless fixation device (for example, Arthrex SwiveLock® anchor) with suture loop end. The steps include: shuttling suture passing through the meniscus 90 using a suture passing device 81 such as Scorpion™ suture passer; passing the repair suture through the meniscus; passing second repair suture through the meniscus; positioning the locking mechanism (Chinese finger trap) towards the tibia plateau; cutting the shuttle suture loop for first adjustable loop, releasing and extracting sutures from the temporary Chinese finger trap portion; transferring the repair suture through the first suture loop; transferring the repair suture through the Chinese finger trap for loop shortening and tensioning; and subsequent suture cutting.

All-inside, self-locking, knotless construct 100, 200 may be provided as a stand-alone surgical construct or, alternatively, may be provided already attached to one or more fixation devices, for example, one or more implantable buttons, anchors, screws, etc., or may be subsequently attached to one or more fixation devices. The fixation device may be any button or any device that allows passing of multiple strands/ends therethrough (for example, through a plurality of openings or apertures or passages formed within a body of the fixation device) to form a plurality of continuous, knotless, self-locking, flexible, adjustable loops 50. In an exemplary embodiment, the fixation device can be a cortical button having a round, oblong, or slanted configuration that allows passage of the flexible strand 10 and formation of interconnection 59.

The all-inside, self-locking, knotless constructs 100, 200 may be utilized to attach soft tissue (tendon) to bone such as in shoulder repair or to fixate a graft in ACL or PCL reconstruction, for example, in a self-locking manner. The all-inside, self-locking, knotless constructs 100, 200 may be utilized in surgical procedures such as meniscal repair, rotator cuff repair, Achilles tendon repair, patellar tendon repair, ACL/PCL reconstruction, hip and shoulder reconstruction procedures, AC joint reconstruction, syndesmosis reconstruction, quad/patellar tendon rupture repair, hallux-valgus repair, biceps tendon repair, humerus and radius repair, and any other tendon repair to bone, among many others, all conducted in an all-inside, knotless, and self-locking manner.

Surgical constructs and methods of knotless tissue repairs are disclosed. Any number of all-inside, self-locking, knotless constructs 100, 200 may be employed in the methods of all-inside, self-locking repairs.

An all-inside, self-locking, adjustable, knotless construct 100, 200 includes at least one flexible strand 10 having a first end 11 and a second end 13; first and second closed, adjustable, continuous, flexible loops 50 interconnected by a loop interconnection 59 to form a single, closed, adjustable, continuous, flexible loop 55; and a locking mechanism 40 (which includes a friction-based mechanism such as Chinese finger trap 33, or a flexible coupler 33 in the form of a suture tape or suture ring or similar structure, among others). The all-inside, self-locking, adjustable, knotless construct 100, 200 can include first and second weave regions 35 having an accordion configuration formed within the flexible coupler and adjacent the first and second closed, adjustable, continuous, flexible loops 50 and adjacent the first and second ends 11, 13. An all-inside, self-locking, adjustable, knotless construct 100, 200 can also include at least one fixation device attached to the at least one flexible strand 10. The fixation device can be any button, implant, anchor (knotted anchor, knotless anchor, all-suture anchor, etc.), screw, plate, etc.

A surgical construct 100, 200 comprises: a flexible strand 10 passed through a locking mechanism 40 (which includes a Chinese finger trap 33, or a flexible coupler 33 in the form of a suture tape or suture ring or similar structure, etc.) to form at least two flexible, adjustable, closed, knotless loops 50 with adjustable perimeters; a loop interconnection 59; and two terminal ends 11, 13. Surgical construct 100, 200 can further comprise two accordion-pleat weave regions 35 formed within the flexible coupler and at a distance apart from the loop interconnection 59. The flexible strand 10 can be a round suture and the flexible coupler can be a suture tape with a flat profile. The locking mechanism can be integral to the flexible strand 10 and formed of same material (provided as a unitary structure during manufacturing). The locking mechanism can be also provided as a separate structure with a material similar to, or dissimilar from, the material of the flexible strand. The flexible strand 10 can connect a first tissue to a second tissue. The terminal ends 11, 13 are pulled to decrease the distance between the locking mechanism and the tissue to be repaired and decrease the length and perimeter of the flexible, adjustable, closed, knotless loop 55.

A method of tissue repair comprises inter alia: passing a flexible strand 10 through or around tissue; passing one of terminal ends 11, 13 of the flexible strand 10, multiple times, through flexible coupler of a locking mechanism 40 to form a first accordion/pleat weave region 35 (a first friction locking weave region 35) and a first plurality of locking points 36, and a first flexible, knotless, continuous, closed adjustable loop 50 with an adjustable perimeter; passing the other of the terminal ends 11, 13 of the flexible strand 10 through the first flexible, knotless, continuous, closed adjustable loop 50 and then through the locking mechanism 40 multiple times to form a second accordion/pleat weave region 35 (a second friction locking weave region 35) and a second plurality of locking points 36, and a second flexible, knotless, continuous, closed adjustable loop 50 with an adjustable perimeter and a loop interconnection 59; securing the locking mechanism to a second tissue (for example, bone); and pulling on the terminal ends 11, 13 to lock the flexible strand 10.

A method of tissue repair comprises inter alia: passing a flexible strand 10 through or around tissue; passing one of terminal ends 11, 13 of the flexible strand 10 through a longitudinal channel of a coreless braid 33 or sleeve (Chinese finger trap) of a locking mechanism 40 to form a first flexible, knotless, continuous, closed adjustable loop 50 with an adjustable perimeter; passing the other of the terminal ends 11, 13 of the flexible strand 10 through the first flexible, knotless, continuous, closed adjustable loop 50 and then through the longitudinal channel of the coreless braid 33 or sleeve (Chinese finger trap) to form a second flexible, knotless, continuous, closed adjustable loop 50 with an adjustable perimeter and a loop interconnection 59; securing the locking mechanism to a second tissue (for example, bone); and pulling on the terminal ends to lock the flexible strand 10.

The all-inside, self-locking, adjustable, knotless construct 100, 200 of the present disclosure has applicability to surgical procedures such as meniscal repair, rotator cuff repair, Achilles tendon repair, patellar tendon repair, ACL/PCL reconstruction, hip and shoulder reconstruction procedures, proximal and/or distal biceps repairs, and any tissue to tissue repair applications.

All-inside, self-locking, adjustable, knotless construct 100, 200 may be formed of all-flexible materials such suture, round or flat suture, suture tape, ribbons, or flat tape (for example, suture tape), or combination of suture and tape. The flexible strands/couplers 10, 33 may have cross-sections of various forms and geometries, including round, oval, rectangular, or flat, among others, or combination of such forms and geometries. In an exemplary embodiment only, flexible strand/coupler 10, 33 may be suture such as FiberWire® suture or flat suture tape that is braided, knitted or woven.

The flexible strands/couplers 10, 33 may include any flexible materials or strands such as suture or tape, for example, multifilament, braided, knitted, woven suture, or including fibers of ultrahigh molecular weight polyethylene (UHMWPE) such as FiberWire® suture (disclosed in U.S. Pat. No. 6,716,234, the disclosure of which is hereby incorporated by reference in its entirety herein). FiberWire® suture is formed of an advanced, high-strength fiber material, namely ultrahigh molecular weight polyethylene (UHMWPE), sold under the tradenames Spectra (Honeywell) and Dyneema (DSM), braided with at least one other fiber, natural or synthetic, to form lengths of suture material. The flexible couplers may be also formed of suture tape, for example, Arthrex FiberTape® suture, which is a high strength suture tape that is braided and rectangular-like in cross section and as disclosed in U.S. Pat. No. 7,892,256, the disclosure of which is incorporated by reference in its entirety herein. Surgical all-inside, self-locking, knotless constructs can be used with any type of flexible material or suture known in the art. If suture tape is employed, the tape may have sections with different tapers (for example, 3 or 4 sections of gradual tapers or gradual widths) to facilitate easy formation of the accordion style weave regions 35.

The flexible strands/couplers 10, 33 may be also formed of a stiff material, or combination of stiff and flexible materials, particularly for the regions of the couplers that are weaved through the body of the coupler and depending on whether they are employed with additional fixation devices. In addition, flexible strands/couplers may be also coated and/or provided in different colors for easy manipulation during the surgical procedure. The knotless constructs and self-locking all-suture soft anchors of the present disclosure can be used with any type of flexible material or suture that may be weaved or passed through itself.

All-inside, self-locking, adjustable, knotless construct 100, 200 may be also coated (partially or totally) with wax (beeswax, petroleum wax, polyethylene wax, or others), silicone (Dow Corning silicone fluid 202A or others), silicone rubbers (Nusil Med 2245, Nusil Med 2174 with a bonding catalyst, or others) PTFE (Teflon®, Hostaflon, or others), PBA (polybutylate acid), ethyl cellulose (Filodel) or other coatings, to improve lubricity of the suture or tape, knot security, pliability, handleability or abrasion resistance, for example. If desired, at least one of the flexible strands/couplers 10, 33 may be coated, impregnated, or otherwise stiffened with a material such as plastic, for example.

The flexible strands/couplers 10, 33 of all-inside, self-locking, adjustable, knotless construct 100, 200 may be also provided with tinted tracing strands, or otherwise contrast visually with the sheath of the construct, which remains a plain, solid color, or displays a different tracing pattern, for example. Various structural elements of all-inside, self-locking, adjustable, knotless construct 100, 200 may be visually coded, making identification and handling of the suture legs simpler. Easy identification of suture in situ is advantageous in surgical procedures, particularly during arthroscopic surgeries, such as endoscopy and laparoscopy.

The term "high strength suture" is defined as any elongated flexible member, the choice of material and size being dependent upon the particular application. For the purposes of illustration and without limitation, the term "suture" as used herein may be a cable, filament, thread, wire, fabric, or any other flexible member suitable for tissue fixation in the body.

What is claimed is:

1. A surgical construct, comprising:
   a flexible strand having a first end and a second end;
   a loop interconnection between the first end and the second end; and
   a locking mechanism between the loop interconnection and the first end and the second end,
   wherein the first end is passed through the locking mechanism multiple times to form a first closed, adjustable, continuous, flexible loop with an adjustable length and a first weave region having an accordion-type configuration.

2. The surgical construct of claim 1, wherein the locking mechanism is a friction-based mechanism.

3. The surgical construct of claim 1, wherein the locking mechanism is a Chinese finger trap, a flexible coupler, or a suture ring.

4. The surgical construct of claim 1, wherein the second end is passed through the locking mechanism multiple times to form a second closed, adjustable, continuous, flexible loop with an adjustable length and a second weave region having an accordion-type configuration.

5. The surgical construct of claim 4, wherein the second end is passed through the first closed, adjustable, continuous, flexible loop to form the loop interconnection, and subsequently through the locking mechanism.

6. The surgical construct of claim 5, wherein each of the first and second closed, adjustable, continuous, flexible loops is located between one of the first and second ends and the loop interconnection.

7. The surgical construct of claim 5, wherein each of the first and second weave regions is located between one of the first and second ends and one of the first and second closed, adjustable, continuous, flexible loops.

8. The surgical construct of claim 1, wherein the flexible strand is attached to one or more fixation devices.

9. The surgical construct of claim 1, wherein the flexible strand is a combination of flat and round suture.

10. The surgical construct of claim 1, wherein the construct is self-locking and tensionable.

11. The surgical construct of claim 1, wherein the flexible strand is unitary with the locking mechanism.

12. The surgical construct of claim 1, wherein the locking mechanism is provided as a separate structure from the flexible strand.

13. A self-locking tensionable construct for tissue repair comprising:
    a flexible strand extending through a friction-based locking mechanism and forming two flexible, continuous, closed, adjustable, knotless loops each having an adjustable length; a loop interconnection; and two terminal ends, wherein each terminal end is passed at least once through the friction-based locking mechanism to each form a plurality of locking points.

14. The self-locking tensionable construct of claim 13, wherein each terminal end is configured to be pulled to lock the surgical construct.

15. The self-locking tensionable construct of claim 13, wherein each terminal end is configured to be pulled to decrease a length of each of the two flexible, continuous, closed, adjustable, knotless loops.

16. The self-locking tensionable construct of claim 13, wherein the tissue repair is rotator cuff repair, AC joint repair, syndesmosis repair, Achilles tendon repair, patellar tendon repair, ACL/PCL reconstruction, hip and shoulder reconstruction, AC joint reconstruction, syndesmosis reconstruction, quad/patellar tendon rupture repair, or hallux-valgus repair.

* * * * *